United States Patent
Zettel et al.

(10) Patent No.: US 8,346,424 B2
(45) Date of Patent: Jan. 1, 2013

(54) METHOD OF MONITORING IN-USE PERFORMANCE RATIOS OF ONBOARD DIAGNOSTIC SYSTEMS FOR PLUG-IN HYBRID ELECTRIC VEHICLES

(75) Inventors: Andrew M. Zettel, Ann Arbor, MI (US); John F. Van Gilder, Webberville, MI (US); Saul Scott, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 242 days.

(21) Appl. No.: 12/942,261

(22) Filed: Nov. 9, 2010

(65) Prior Publication Data

US 2012/0072060 A1    Mar. 22, 2012

Related U.S. Application Data

(60) Provisional application No. 61/384,556, filed on Sep. 20, 2010.

(51) Int. Cl.
*B60L 9/00* (2006.01)
(52) U.S. Cl. ........ 701/22; 701/31.8; 701/31.9; 340/438; 180/65.21
(58) Field of Classification Search ............... 701/22, 701/29.4, 31.8, 31.9, 33.4; 340/425.5, 438, 340/439; 903/902; 180/65.21
See application file for complete search history.

(56) References Cited

U.S. PATENT DOCUMENTS

| | | | | |
|---|---|---|---|---|
| 6,839,622 B2 * | 1/2005 | Kura et al. | | 701/114 |
| 6,950,742 B2 * | 9/2005 | Yamaguchi et al. | | 701/114 |
| 7,152,587 B2 * | 12/2006 | Suzuki | | 123/518 |
| 7,448,367 B1 * | 11/2008 | Reddy et al. | | 123/520 |
| 7,975,675 B2 * | 7/2011 | Menke | | 123/519 |

* cited by examiner

*Primary Examiner* — Gertrude Arthur Jeanglaude
(74) *Attorney, Agent, or Firm* — Quinn Law Group, PLLC

(57) ABSTRACT

A method of monitoring an onboard diagnostic system for a plug-in hybrid electric vehicle includes incrementing the denominator of an N/D ratio for the onboard diagnostic system only when a total time criteria, a vehicle speed criteria and an idle criteria are satisfied after an internal combustion engine of the vehicle has been fueled. The diagnostic system performance is summarized into a single N/D ratio. When an underperforming ratio is identified, the system controls the engine to provide more engine operation and subsequent diagnostic observability. The denominator of the N/D ratio is compared to a verification denominator to identify vehicles that are typically operated in a manner such that an engine-on cycle does not begin, or is not identified, until very near the end of the drive cycle, thereby preventing the denominator and a numerator of the N/D ratio from incrementing, and thereby providing a false passing performance ratio.

20 Claims, 1 Drawing Sheet

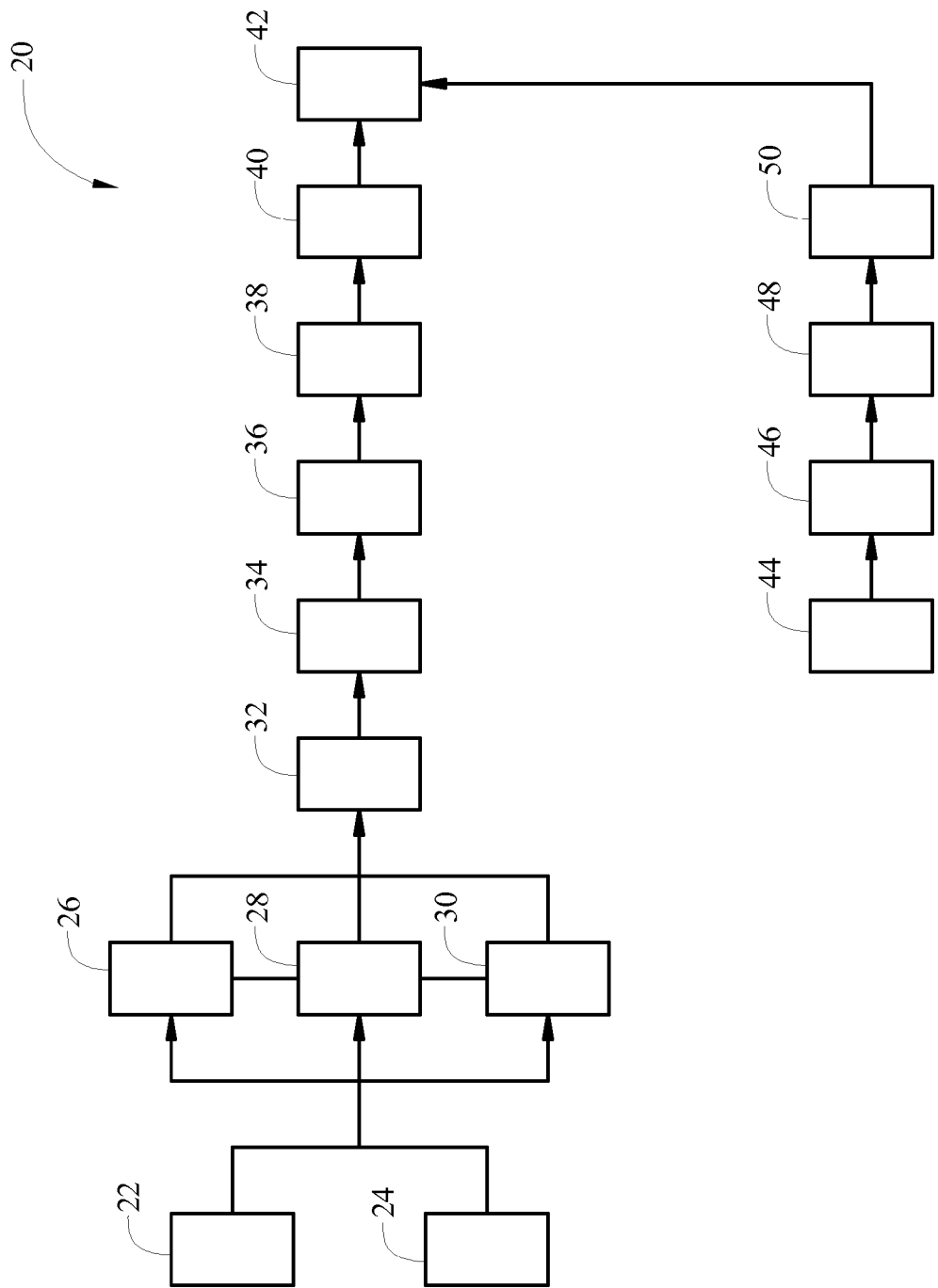

METHOD OF MONITORING IN-USE PERFORMANCE RATIOS OF ONBOARD DIAGNOSTIC SYSTEMS FOR PLUG-IN HYBRID ELECTRIC VEHICLES

CROSS-REFERENCE TO RELATED APPLICATIONS

This application claims the benefit if U.S. Provisional Patent Application Ser. No. 61/384,556, filed on Sep. 20, 2010, the disclosure of which is hereby incorporated by reference.

TECHNICAL FIELD

The invention generally relates to a method of monitoring onboard diagnostic systems, and more specifically to a method of monitoring an in-use performance ratio of an onboard diagnostic system for a plug-in hybrid electric vehicle.

BACKGROUND

The California Air Resources Board (CARB) mandates that vehicles powered by an internal combustion engine must include onboard Diagnostic systems to monitor the operation of the internal combustion engine and other components to ensure ongoing vehicle compliance with air quality standards.

The onboard diagnostic systems begin operation each time the vehicle is started. In order to track the performance of the onboard diagnostic systems and verify that the various vehicle systems and/or components are being tested, and that the onboard diagnostic systems are completing their tests, each vehicle includes a control algorithm that tracks a ratio of the number of times the onboard diagnostic system tests are successfully completed to the number of times minimum criteria are met, sometimes referred to as "Standard Conditions Met" (SCM) criteria. This may be referred to as the "N/D ratio". Every time the SCM criteria, described in greater detail below, are satisfied, the denominator "D" is incremented. Every time the onboard diagnostic systems successfully complete their diagnostic checks or time sufficient to identify a failing diagnostic check has passed, the numerator "N" is incremented. Accordingly, if the onboard diagnostic systems complete their diagnostic checks every time the SCM criteria are satisfied, then the N/D ratio would equal one (1). For example, if the SCM criteria are satisfied one hundred times (D=100), and the onboard diagnostic systems complete the diagnostic checks each of those occurrences (N=100), then the N/D ratio is equal to 100/100, which is equal to 1. However, if the onboard diagnostic systems complete their diagnostic checks only half the time the SCM criteria are satisfied, then the N/D ratio would equal 0.5. For example, if the SCM criteria are satisfied one hundred times (D=100), and the onboard diagnostic systems complete the diagnostic checks only half of those occurrences (N=50), then the N/D ratio is equal to 50/100, which is equal to 0.5. If, upon the next drive cycle wherein the SCM criteria are satisfied and the diagnostic check does not successfully complete, the numerator N does not increment (N remains equal to 50), but the denominator D does increment (D=101 and the N/D ratio is equal to 50/101. The N/D ratio must remain over a predefined level to ensure proper functioning of the onboard diagnostic systems and satisfy the CARB requirements. For example, the N/D ratio for each onboard diagnostic system typically must remain over 0.333 to satisfy the CARB requirements.

As noted above, the vehicle must satisfy certain minimum criteria before the "D" of the N/D ratio may be incremented, i.e., the SCM criteria. However, even if the vehicle satisfies the three minimum criteria to increment the D of the N/D ratio, the onboard diagnostic systems may not have enough time to complete their diagnostic checks of the various systems and/or components, which would prevent the numerator N from incrementing. These minimum criteria include a total time criteria, a vehicle speed criteria and an idle criteria. Accordingly, once the vehicle is started and operation of the onboard diagnostic systems has begun, the vehicle must remain on for a total time of six hundred seconds (600 sec) to satisfy the total time criteria, the speed of the vehicle must remain over twenty five miles per hour (25 mph) for at least three hundred seconds (300 sec) to satisfy the vehicle speed criteria, and the vehicle must remain at idle, i.e., a vehicle speed equal to zero miles per hour (0 mph), for at least thirty seconds (30) to satisfy the idle criteria. If the vehicle is turned off prior to all three of these criteria being satisfied, then the D of the N/D ratio does not increment.

Satisfying the N/D ratio requirements under the CARB mandates is usually not a problem for traditional vehicles that are powered only by internal combustion engines, i.e., the internal combustion engine is always operating when the vehicle is turned on, providing sufficient time for the vehicle to satisfy the three minimum criteria to increment the D of the N/D ratio and allow the onboard diagnostic systems to fully complete their diagnostic checks. However, for plug-in electric hybrid vehicles, meeting the N/D ratio requirements becomes more difficult. This is because the vehicle may be turned on and moving under electric power, without ever starting the internal combustion engine. If the vehicle is operating under electric power and the internal combustion engine does not start until a period of time into the trip, the three minimum criteria may be satisfied and the D of the N/D ratio is incremented, without the onboard diagnostic systems having sufficient time to complete their diagnostic checks, which leads to the numerator N of the N/D ratio not incrementing. Accordingly, the denominator D of the N/D ratio increments, whether the vehicle is operating under electric power or powered by the internal combustion engine, but the numerator N of the N/D ratio does not increment because of insufficient time remaining in the drive cycle to complete the diagnostic check. This leads to a low N/D ratio, which may bring the plug-in electric hybrid vehicle out of compliance with the N/D ratio requirements under the CARB mandates.

SUMMARY

A method of monitoring an onboard diagnostic system for a plug-in hybrid electric vehicle is provided. The method includes defining an in-use performance ratio to be equal to a saved numerator divided by a saved denominator. The method further includes monitoring a vehicle-on status of the vehicle to determine when the vehicle is turned on to define a drive cycle. The method further includes monitoring an engine-on status of an internal combustion engine of the vehicle to determine when the internal combustion engine is fueled during each drive cycle to define an engine-on cycle. The method further includes measuring a period of time the vehicle is turned on after the internal combustion engine is fueled for each drive cycle. The method further includes measuring a period of time the vehicle is turned on and operating at a speed equal to zero miles per hour (0 mph) after the internal combustion engine is fueled for each drive cycle. The method further includes measuring a period of time the vehicle is turned on and operating at a speed greater than a pre-determined speed after the internal combustion engine is fueled for each drive cycle. The method further includes incrementing the saved denominator to define a current denominator for each drive cycle. The saved denominator is incremented when the vehicle has been turned on for a period of time greater than a pre-defined minimum total time criteria after the internal combustion engine is fueled, the vehicle has been operating at a speed equal to zero miles per hour (0 mph) for a pre-defined minimum idle criteria after the internal combustion engine is fueled, and the vehicle has been operating at a speed greater than the pre-determined speed for a pre-defined minimum time criteria after the internal combustion engine is fueled. The method further includes incrementing the saved numerator to define a current numerator for each drive cycle when the onboard diagnostic system successfully completes a diagnostic check. The method further includes calculating a current in-use performance ratio after each identified drive cycle by dividing the current numerator by the current denominator when the saved numerator has been incremented during the drive cycle, or by dividing the saved numerator by the current denominator when the saved numerator has not been incremented during the drive cycle.

A method of monitoring an onboard diagnostic system for a plug-in hybrid electric vehicle is also provided. The method includes defining an in-use performance ratio to be equal to a saved numerator divided by a saved denominator. The method further includes monitoring a vehicle-on status of the vehicle to determine when the vehicle is turned on to define a drive cycle. The method further includes monitoring an engine-on status of an internal combustion engine of the vehicle to determine when the internal combustion engine is fueled during each drive cycle to define an engine-on cycle. The method further includes measuring a period of time the vehicle is turned on after the internal combustion engine is fueled for each drive cycle. The method further includes measuring a period of time the vehicle is turned on and operating at a speed equal to zero miles per hour (0 mph) after the internal combustion engine is fueled for each drive cycle. The method further includes measuring a period of time the vehicle is turned on and operating at a speed greater than a pre-determined speed after the internal combustion engine is fueled for each drive cycle. The method further includes incrementing the saved denominator to define a current denominator for each drive cycle. The saved denominator is incremented when the vehicle has been turned on for a period of time greater than a pre-defined minimum total time criteria after the internal combustion engine is fueled, the vehicle has been operating at a speed equal to zero miles per hour (0 mph) for a pre-defined minimum idle criteria after the internal combustion engine is fueled, and the vehicle has been operating at a speed greater than the pre-determined speed for a pre-defined minimum time criteria after the internal combustion engine is fueled. The method further includes incrementing the saved numerator to define a current numerator for each drive cycle when the onboard diagnostic system successfully completes a diagnostic check. The method further includes calculating a current in-use performance ratio after each identified drive cycle by dividing the current numerator by the current denominator when the saved numerator has been incremented during the drive cycle, or by dividing the saved numerator by the current denominator when the saved numerator has not been incremented during the drive cycle. The method further includes defining a denominator floor ratio equal to the current denominator divided by a verification denominator, and incrementing the verification denominator. The verification denominator is incremented after each identified drive cycle that includes the vehicle turned on for a period of time greater than the pre-defined minimum total time criteria, the vehicle operating at a speed equal to zero miles per hour (0 mph) for the pre-defined minimum idle criteria, the vehicle operating at a speed greater than the pre-determined speed for the pre-defined minimum time criteria, and the internal combustion engine fueled during the identified drive cycle.

Accordingly, the performance ratio of the onboard diagnostic system, i.e., the N/D ratio for the onboard diagnostic system, incorporates the engine-on cycle into the criteria required to increment the denominator D of the N/D ratio, which allows for more accurate measurement of the N/D ratio for plug-in electric hybrid vehicles that may not start their internal combustion engine during each drive cycle. Additionally, the denominator floor ratio is compared to a pre-defined minimum denominator floor ratio value to identify vehicles that are typically operated in a manner such that the engine-on cycle does not begin, until very near the end of the drive cycle, thereby preventing the saved denominator and the saved numerator from incrementing and providing a false passing performance ratio.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a flow chart of a method of monitoring an onboard diagnostic system for a plug-in hybrid electric vehicle.

DETAILED DESCRIPTION

Referring to the Figures, wherein like numerals indicate like parts throughout the several views, a method of monitoring an onboard diagnostic system for a plug-in hybrid electric vehicle is shown generally at 20. The onboard diagnostic system monitors and/or tests at least one component and/or system of the vehicle. For example, the onboard diagnostic system may monitor the operation of a catalytic converter of the vehicle. The onboard diagnostic system may run an algorithm that tests the component and/or system, or may monitor one or more sensors that provide information relating to the operation of the component and/or system, that the onboard diagnostic system then uses to determine if the component and/or system is functioning properly. For example, the onboard diagnostic system may be coupled to one or more sensors for sensing data related to exhaust gas from an internal combustion engine. The onboard diagnostic system may utilize the sensed data from the sensors to determine if the catalytic converter is properly treating the exhaust gas to reduce emissions from the exhaust gas. The onboard diagnostic system may be implemented as an algorithm operable on a controller of the vehicle. It should be appreciated that the vehicle may include several different onboard diagnostic systems for verifying the proper functionality of several different components and/or systems of the vehicle.

The onboard diagnostic system begins operation after certain criteria are satisfied, each time the vehicle is turned on, i.e., for each drive cycle. In order to track the performance of the onboard diagnostic system and verify that the various vehicle systems and/or components are being tested, and that the onboard diagnostic system is completing the diagnostic check, each vehicle includes a control algorithm that tracks a ratio of the number of times the onboard diagnostic system tests are successfully completed to the number of times the pre-defined criteria are satisfied. This may be referred to as the "N/D ratio" or the in-use performance ratio. A successful completion of the diagnostic check occurs when the onboard diagnostic system determines that the system and/or component being checked is or is not operating within prescribed parameters, i.e., passes or fails.

Every time the certain pre-defined minimum criteria are satisfied, described in greater detail below, the denominator "D" is incremented. Every time the onboard diagnostic system successfully completes the diagnostic check, the numerator "N" is incremented. Accordingly, if the onboard diagnostic system completes the diagnostic check every time the pre-defined minimum criteria are satisfied, then the N/D ratio would equal one (1). For example, if the pre-defined minimum criteria are satisfied one hundred times (D=100), and the onboard diagnostic system successfully completes the diagnostic checks for each of those occurrences (N=100), then the N/D ratio is 100/100, which is equal to 1. However, if the onboard diagnostic system successfully completes the diagnostic check only half the time the pre-defined minimum criteria are satisfied, then the N/D ratio would equal 0.5. For example, if the pre-defined minimum criteria are satisfied one hundred times (D=100), and the onboard diagnostic system completes the diagnostic check only half of those occurrences (N=50), then the N/D ratio is 50/100, which is equal to 0.5. If, upon the next drive cycle wherein the certain pre-defined criteria are satisfied and the diagnostic check does not successfully complete, the numerator N does not increment (N remains equal to 50), but the denominator D does increment (D=101 and the N/D ratio is equal to 50/101.

The N/D ratio must remain over a pre-defined level to verify proper functioning of the onboard diagnostic system. For example, the N/D ratio for each onboard diagnostic system typically must remain over 0.333 to satisfy state and/or federally mandated requirements. However, the pre-defined ratio may be set to any level.

While each different onboard diagnostic system may require the vehicle or components thereof to be operating within certain parameters before the onboard diagnostic system begins to run, as noted above, the vehicle must satisfy certain pre-defined minimum criteria before the "D" of the N/D ratio may be incremented. However, even if the vehicle satisfies the certain pre-defined minimum criteria necessary to increment the D of the N/D ratio, the onboard diagnostic system may not have enough time to complete their diagnostic checks of the various systems and/or components. These pre-defined minimum criteria include a total time criteria, a vehicle speed criteria, an idle criteria and an engine-on criteria. Accordingly, once the vehicle is turned on and operation of the onboard diagnostic system has begun, the internal combustion engine of the vehicle must be fueled, i.e., in the engine-on cycle, the vehicle must remain on for a total time of six hundred seconds (600 sec) after the engine is fueled to satisfy the total time criteria, the speed of the vehicle must remain over twenty five miles per hour (25 mph) for at least three hundred seconds (300 sec) after the engine is fueled to satisfy the vehicle speed criteria, the vehicle must remain at idle, i.e., a vehicle speed equal to zero miles per hour (0 mph), for at least thirty seconds (30) after the engine is fueled to satisfy the idle criteria. Accordingly, the total time criteria, the vehicle speed criteria and the idle criteria are all measured from a time when the internal combustion engine is fueled, i.e., from the start of the engine-on cycle. If the vehicle is turned off, prior to the total time criteria, the vehicle speed criteria and the idle criteria being satisfied, then the D of the N/D ratio is not incremented.

Including the engine-on criteria in the criteria required to increment the denominator D of the N/D ratio ensures that the denominator D does not increment unless the internal combustion engine is fueled. This is particularly important for plug-in hybrid electric vehicles that may not start the internal combustion engine every drive cycle, which thereby prevents any onboard diagnostic systems related to the internal combustion engine, such as but not limited to the catalytic converter for the exhaust gas, from being checked. Accordingly, the denominator D only increments for drive cycles when the internal combustion is fueled, i.e., when the vehicle starts an engine-on cycle.

Certain diagnostic checks require the internal combustion engine to run for a minimum period of time, i.e., a minimum engine-on cycle. However, with plug-in electric hybrid vehicles, the internal combustion engine may not run for the minimum engine-on cycle. Accordingly, all of the other criteria may be met, thereby allowing the denominator D to increment, but the diagnostic check may not successfully complete, thereby preventing the numerator N from incrementing. This may also lead to the N/D ratio falling below the pre-defined level.

In order to identify the instances where the internal combustion engine of the plug-in electric hybrid vehicle is not fueling for the minimum engine-on cycle, a control algorithm may compare the N/D ratio to a minimum performance ratio floor. If the N/D ratio falls below the minimum performance ratio floor, then the control algorithm controls the internal combustion engine to remain running, i.e., maintain the engine-on cycle, after the next time the internal combustion engine is fueled. In other words, upon the internal combustion engine being fueled to begin an engine-on cycle in the due course of the drive cycle, the controller continues to fuel the internal combustion engine to ensure the engine-on cycle is of sufficient duration for any diagnostic checks whose N/D ratio is below the minimum performance ratio floor to run. Assuming that the vehicle component and/or system being diagnosed is functioning properly, this will allow the numerator N to increment, thereby increasing the N/D ratio, and providing a level of assurance that the vehicle component and/or system is functioning properly.

Due to particular driving habits and/or drive cycles of the vehicle, the internal combustion engine may only rarely be fueled, or the internal combustion engine may only run toward an end of the drive cycle. When this occurs the denominator D of the N/D ratio may never increment, or increment very little, thereby providing a passing N/D ratio without sufficiently verifying the operation of the vehicle component and/or system on a regular basis. It is important to ensure that the vehicle components and/or systems are checked on a regular basis to ensure proper functioning, or to identify a malfunction as quickly as possible.

In order to identify those occurrences when the internal combustion engine is never or rarely fueled, or is only fueled late in the drive cycle thereby preventing the denominator D from incrementing, a control algorithm may calculate a denominator floor ratio, and compare the denominator floor ratio to a pre-defined minimum denominator floor ratio. The denominator floor ratio is equal to the denominator D described above, divided by a verification denominator. The verification denominator is the number of times the vehicle is turned on, the engine is fueled, the total time criteria is satisfied, the vehicle speed criteria is satisfied, and the idle criteria is satisfied. The total time criteria, the vehicle speed criteria and the idle criteria are measured from a time when the vehicle is turned on, i.e., measured from the beginning of the drive cycle, and are not measured from the beginning of the engine-on cycle. The verification ratio measures the number of times the denominator D is incremented relative to the number of times the vehicle is on for a time sufficient to complete the diagnostic checks, and the engine is fueled but not necessarily for a time sufficient to complete the diagnostic checks. If the denominator floor ratio falls below the minimum denominator floor ratio, indicating that the internal combustion engine is being fueled late in the drive cycle thereby preventing the denominator D from incrementing, then a controller may start, i.e., fuel, the internal combustion engine the next drive cycle, and maintain operation of, i.e., continue fueling, the internal combustion engine for a time sufficient to allow the diagnostic checks to successfully complete, to thereby allow the numerator N to increment.

The method of monitoring the onboard diagnostic system for the plug-in hybrid electric vehicle includes defining an in-use performance ratio. The in-use performance ratio may include the N/D ratio described above, and is equal to a saved numerator N divided by a saved denominator D.

The method may further include monitoring a vehicle-on status of the vehicle to determine when the vehicle is turned on to define a drive cycle, indicated at 22. The drive cycle begins when the vehicle is turned on, and ends when the vehicle is turned off. Because the vehicle includes a plug-in hybrid electric vehicle, the drive cycle does not need to include, but may include, an engine-on cycle, described in greater detail below.

The method may further include monitoring an engine-on status of an internal combustion engine of the vehicle to determine when the internal combustion engine is fueled during each drive cycle to define an engine-on cycle, indicated at 24. The engine-on cycle begins when the internal combustion engine is fueled, i.e., is started, and ends when the internal combustion engine is not fueled, i.e., the internal combustion engine is turned off.

The method further includes measuring a period of time the vehicle is turned on after the internal combustion engine is fueled for each drive cycle, indicated at 26. The period of time is measured from the beginning of the engine-on cycle, i.e., from the time the internal combustion engine is fueled.

The method further includes measuring a period of time the vehicle is turned on and operating at a speed equal to zero miles per hour (0 mph) after the internal combustion engine is fueled for each drive cycle, indicated at 28. The period of time is measured from the beginning of the engine-on cycle, i.e., from the time the internal combustion engine is fueled.

The method may further include measuring a period of time the vehicle is turned on and operating at a speed greater than a pre-determined speed after the internal combustion engine is fueled for each drive cycle, indicated at 30. The period of time is measured from the beginning of the engine-on cycle, i.e., from the time the internal combustion engine is fueled.

The method may further include incrementing the saved denominator to define a current denominator for each drive cycle in which the pre-defined minimum criteria are satisfied, indicated at 32. The pre-defined minimum criteria are met when the vehicle has been turned on for a period of time greater than the pre-defined minimum total time criteria after the internal combustion engine is fueled, the vehicle has been operating at a speed equal to zero miles per hour (0 mph) for the pre-defined minimum idle criteria after the internal combustion engine is fueled, and the vehicle has been operating at a speed greater than the pre-determined speed for the pre-defined minimum time criteria after the internal combustion engine is fueled. The pre-defined minimum total time criteria may include but is not limited to a time period equal to six hundred seconds (600 sec). The pre-defined minimum idle criteria may include but is not limited to a period of time equal to thirty seconds (30 sec). The pre-determined speed of the vehicle speed criteria may include but is not limited to a speed of twenty five miles per hour (25 mph), and the pre-defined minimum time criteria may include but is not limited to a period of time equal to three hundred seconds (300 sec).

The method may further include incrementing the saved numerator to define a current numerator for each drive cycle when the onboard diagnostic system successfully completes a diagnostic check, indicated at 34. A successful completion of the diagnostic check includes the onboard diagnostic system determining that the object of the diagnostic check is or is not functioning properly or within acceptable parameters. If the diagnostic check is not successfully completed, the numerator N is not incremented.

The method may further include calculating a current in-use performance ratio, i.e., calculating a current value for the N/D ratio, after each identified drive cycle, indicated at 36. The current in-use performance ratio is calculated by dividing the current numerator by the current denominator when the saved numerator has been incremented during the drive cycle. If the saved numerator has not been incremented, for example, the diagnostic check was not completed successfully, then the current in-use performance ratio is calculated by dividing the saved numerator by the current denominator.

The method may further include saving the current numerator as the saved numerator for reference during the next identified drive cycle, and saving the current denominator as the saved denominator for reference during the next identified drive cycle. Accordingly, the N/D in use performance ratio is an ongoing and cyclical measure of the number of times the diagnostic check is successfully completed vs. the number of times the pre-defined minimum criteria have been satisfied, even though the diagnostic check may not have had sufficient time to complete.

The method may further include comparing the current N/D in-use performance ratio to a minimum performance ratio floor to determine if the current in-use performance ratio is greater than the minimum performance ratio floor or less than the minimum performance ratio floor, indicated at 38. If the controller determines that the current N/D in-use performance ratio is less than the minimum performance ratio floor, then the method may further include maintaining operation of, i.e., continuing to fuel, the internal combustion engine during the next engine-on cycle, indicated at 40. The fueling of the engine is maintained in the engine-on cycle for a time sufficient to allow the onboard diagnostic system to complete the diagnostic check, which allows the onboard diagnostic system to successfully complete the diagnostic check, which allows the saved numerator to increment if the diagnostic check is successfully completed. Once the diagnostic check is completed, the forced fueling of the internal combustion engine to complete the diagnostic check ceases, and operation of the vehicle may return to normal.

If the current in-use performance ratio is less than the minimum performance ratio floor, then the method may further include controlling operation of the internal combustion engine during the next identified engine-on cycle, indicated at 42. The operation of the internal combustion engine may be controlled to ensure the operation of the vehicle falls within a set of diagnostic initiation parameters of the onboard diagnostic system that must be satisfied for the onboard diagnostic system to begin the diagnostic check. As noted above, the different onboard diagnostic systems may include certain parameters that the engine must be operating within in order to begin the diagnostic check. For example, the engine may need to be operated within a defined rpm range in order to begin a diagnostic check. Accordingly, if the current in-use performance ratio is less than the minimum performance ratio floor, the engine may be controlled to ensure that the diagnostic check begins and completes during the next engine-on cycle, thereby allowing the numerator N to increment faster than if no engine control intervention occurred.

The minimum performance ratio floor may be defined to include any value greater than zero (0). However, the minimum performance ratio floor is preferably defined to include a value between the range of 0 and 0.5, and is more preferably defined to include a value between the range of 0.05 and 0.1.

The method may further include defining a denominator floor ratio. The denominator floor ratio is used to identify an instance where the internal combustion engine is started near the end of the drive cycle, thereby preventing the denominator D from incrementing and providing a misleading good N/D in-use performance ratio. The denominator floor ratio is used to identify instances when internal combustion engine intervention is required, such as but not limited to rpm targeting and/or deceleration fuel cut-off. The denominator floor ratio is defined to equal the current denominator divided by a verification denominator. The verification denominator is a measure of the number of times the total time criteria, the idle criteria and the engine speed criteria are satisfied as measured from the beginning of the drive cycle (not the beginning of the engine-on cycle), in combination with the engine being fueled. The method may further include incrementing the verification denominator after each identified drive cycle that includes the vehicle turned on for a period of time greater than the pre-defined minimum total time criteria, the vehicle operating at a speed equal to zero miles per hour (0 mph) for the pre-defined minimum idle criteria, the vehicle operating at a speed greater than the pre-determined speed for the pre-defined minimum time criteria, and the internal combustion engine fueled during the identified drive cycle, indicated at 44.

The method may further include calculating a current denominator floor ratio after the verification denominator has been incremented for each drive cycle, indicated at 46. A high current denominator floor ratio indicates that the denominator D is being incremented on a regular basis with the drive cycles. A low current denominator floor ratio indicates that the denominator D is not being incremented on a regular basis when the internal combustion engine is fueled and the drive cycle lasted for a significant time period.

The method further includes comparing the current denominator floor ratio to a pre-defined minimum denominator floor ratio value to determine if the current denominator floor ratio is greater than the pre-defined minimum denominator floor ratio value or if the current denominator floor ratio is less than the pre-defined minimum denominator floor ratio value, indicated at 48. The pre-defined minimum denominator floor ratio may be set to any number between zero and one, but is preferably set to a number between the range of 0.05 and 0.1.

If the current denominator floor ratio is less than the pre-defined minimum denominator floor ratio value, then the method may include fueling the internal combustion engine immediately upon the next drive cycle, indicated at 50. The engine is fueled to begin an engine-on cycle. The method further includes maintaining operation of the internal combustion engine, i.e., continuing to fuel the internal combustion engine, for a time sufficient to allow the onboard diagnostic system to complete a diagnostic check, and to allow the saved numerator to increment if the diagnostic check is successfully completed.

When the current denominator floor ratio is less than the pre-defined minimum denominator floor ratio value, the method may further include controlling the operation of the internal combustion engine during the next engine-on cycle to ensure the operation of the vehicle falls within a set of diagnostic initiation parameters of the onboard diagnostic system that must be satisfied in order for the onboard diagnostic system to begin the diagnostic check, indicated at 42. The operation of the internal combustion engine may be controlled to ensure the operation of the vehicle falls within a set of diagnostic initiation parameters of the onboard diagnostic system that must be satisfied for the onboard diagnostic system to begin the diagnostic check. As noted above, the different onboard diagnostic systems may include certain parameters that the engine must be operating within in order to begin the diagnostic check. For example, the engine may need to be operated within a defined rpm range in order to begin a diagnostic check. Accordingly, if the current denominator floor ratio is less than the pre-defined minimum denominator floor ratio value, in this example the engine speed may be controlled to ensure that the diagnostic check begins and completes during the next engine-on cycle, thereby allowing the numerator N to increment if the diagnostic check is successfully completed.

While the best modes for carrying out the invention have been described in detail, those familiar with the art to which this invention relates will recognize various alternative designs and embodiments for practicing the invention within the scope of the appended claims.

The invention claimed is:

1. A method of monitoring an onboard diagnostic system for a plug-in hybrid electric vehicle, the method comprising:
    defining an in-use performance ratio to be equal to a saved numerator divided by a saved denominator;
    monitoring a vehicle-on status of the vehicle to determine when the vehicle is turned on to define a drive cycle;
    monitoring an engine-on status of an internal combustion engine of the vehicle to determine when the internal combustion engine is fueled during each drive cycle to define an engine-on cycle;
    measuring a period of time the vehicle is turned on after the internal combustion engine is fueled for each drive cycle;
    measuring a period of time the vehicle is turned on and operating at a speed equal to zero miles per hour (0 mph) after the internal combustion engine is fueled for each drive cycle;
    measuring a period of time the vehicle is turned on and operating at a speed greater than a pre-determined speed after the internal combustion engine is fueled for each drive cycle;
    incrementing the saved denominator to define a current denominator for each drive cycle when the vehicle has been turned on for a period of time greater than a pre-defined minimum total time criteria after the internal combustion engine is fueled, the vehicle has been operating at a speed equal to zero miles per hour (0 mph) for a pre-defined minimum idle criteria after the internal combustion engine is fueled, and the vehicle has been operating at a speed greater than the pre-determined speed for a pre-defined minimum time criteria after the internal combustion engine is fueled;

incrementing the saved numerator to define a current numerator for each drive cycle when the onboard diagnostic system successfully completes a diagnostic check; and calculating a current in-use performance ratio after each identified drive cycle by dividing the current numerator by the current denominator when the saved numerator has been incremented during the drive cycle, or by dividing the saved numerator by the current denominator when the saved numerator has not been incremented during the drive cycle.

2. A method as set forth in claim 1 further comprising saving the current numerator as the saved numerator for reference during a next identified drive cycle, and saving the current denominator as the saved denominator for reference during the next identified drive cycle.

3. A method as set forth in claim 1 further comprising comparing the current in-use performance ratio to a minimum performance ratio floor to determine if the current in-use performance ratio is greater than the minimum performance ratio floor or less than the minimum performance ratio floor.

4. A method as set forth in claim 3 further comprising maintaining operation of the internal combustion engine during the next engine-on cycle for a time sufficient to allow the onboard diagnostic system to complete a diagnostic check when the current in-use performance ratio is less than the minimum performance ratio floor to allow the onboard diagnostic system to successfully complete the diagnostic check to allow the saved numerator to increment.

5. A method as set forth in claim 4 further comprising controlling operation of the internal combustion engine during the next identified engine-on cycle when the current in-use performance ratio is less than the minimum performance ratio floor to ensure the operation of the vehicle falls within a set of diagnostic initiation parameters of the onboard diagnostic system that must be satisfied for the onboard diagnostic system to begin the diagnostic check.

6. A method as set forth in claim 3 further comprising defining the ratio floor to include a value greater than zero (0).

7. A method as set forth in claim 6 wherein defining the ratio floor to include a value greater than zero (0) is further defined as defining the ratio floor to include a value between the range of 0 and 0.5.

8. A method as set forth in claim 7 wherein defining the ratio floor to include a value between the range of 0 and 0.5 is further defined as defining the ratio floor to include a value between the range of 0.05 and 0.10.

9. A method as set forth in claim 1 further comprising defining a denominator floor ratio equal to the current denominator divided by a verification denominator.

10. A method as set forth in claim 9 further comprising incrementing the verification denominator after each identified drive cycle that includes the vehicle turned on for a period of time greater than the pre-defined minimum total time criteria, the vehicle operating at a speed equal to zero miles per hour (0 mph) for the pre-defined minimum idle criteria, the vehicle operating at a speed greater than the pre-determined speed for the pre-defined minimum time criteria, and the internal combustion engine being fueled during the identified drive cycle.

11. A method as set forth in claim 10 further comprising calculating a current denominator floor ratio after the verification denominator has been incremented for each drive cycle.

12. A method as set forth in claim 11 further comprising comparing the current denominator floor ratio to a pre-defined minimum denominator floor ratio value to determine if the current denominator floor ratio is greater than the pre-defined minimum denominator floor ratio value or if the current denominator floor ratio is less than the pre-defined minimum denominator floor ratio value.

13. A method as set forth in claim 12 further comprising starting the internal combustion engine immediately upon the next drive cycle when the current denominator floor ratio is less than the pre-defined minimum denominator floor ratio value.

14. A method as set forth in claim 13 further comprising maintaining operation of the internal combustion engine for a time sufficient to allow the onboard diagnostic system to complete a diagnostic check to allow the saved numerator to increment.

15. A method as set forth in claim 12 further comprising controlling the operation of the internal combustion engine during the next identified engine-on cycle when the current denominator floor ratio is less than the pre-defined minimum denominator floor ratio value to ensure the operation of the vehicle falls within a set of diagnostic initiation parameters of the onboard diagnostic system that must be satisfied in order for the onboard diagnostic system to begin the diagnostic check.

16. A method of monitoring an onboard diagnostic system for a plug-in hybrid electric vehicle, the method comprising:

defining an in-use performance ratio to be equal to a saved numerator divided by a saved denominator;

monitoring a vehicle-on status of the vehicle to determine when the vehicle is turned on to define a drive cycle;

monitoring an engine-on status of an internal combustion engine of the vehicle to determine when the internal combustion engine is fueled during each drive cycle to define an engine-on cycle;

measuring a period of time the vehicle is turned on after the internal combustion engine is fueled for each drive cycle;

measuring a period of time the vehicle is turned on and operating at a speed equal to zero miles per hour (0 mph) after the internal combustion engine is fueled for each drive cycle;

measuring a period of time the vehicle is turned on and operating at a speed greater than a pre-determined speed after the internal combustion engine is fueled for each drive cycle;

incrementing the saved denominator to define a current denominator for each drive cycle when the vehicle has been turned on for a period of time greater than a pre-defined minimum total time criteria after the internal combustion engine is fueled, the vehicle has been operating at a speed equal to zero miles per hour (0 mph) for a pre-defined minimum idle criteria after the internal combustion engine is fueled, and the vehicle has been operating at a speed greater than the pre-determined speed for a pre-defined minimum time criteria after the internal combustion engine is fueled;

incrementing the saved numerator to define a current numerator for each drive cycle when the onboard diagnostic system successfully completes a diagnostic check;

calculating a current in-use performance ratio after each identified drive cycle by dividing the current numerator by the current denominator when the saved numerator has been incremented during the drive cycle, or by dividing the saved numerator by the current denominator when the saved numerator has not been incremented during the drive cycle;

comparing the current in-use performance ratio to a minimum performance ratio floor to determine if the current in-use performance ratio is greater than the minimum performance ratio floor or less than the minimum performance ratio floor;

maintaining operation of the internal combustion engine during the next engine-on cycle for a time sufficient to allow the onboard diagnostic system to complete a diagnostic check when the current in-use performance ratio is less than the minimum performance ratio floor to allow the onboard diagnostic system to successfully complete the diagnostic check to allow the saved numerator to increment;

defining a denominator floor ratio equal to the current denominator divided by a verification denominator; and incrementing the verification denominator after each identified drive cycle that includes the vehicle turned on for a period of time greater than the pre-defined minimum total time criteria, the vehicle operating at a speed equal to zero miles per hour (0 mph) for the pre-defined minimum idle criteria, the vehicle operating at a speed greater than the pre-determined speed for the pre-defined minimum time criteria, and the internal combustion engine turned during the identified drive cycle.

17. A method as set forth in claim 16 further comprising calculating a current denominator floor ratio after the verification denominator has been incremented for each drive cycle.

18. A method as set forth in claim 17 further comprising comparing the current denominator floor ratio to a pre-defined minimum denominator floor ratio value to determine if the current denominator floor ratio is greater than the pre-defined minimum denominator floor ratio value or if the current denominator floor ratio is less than the pre-defined minimum denominator floor ratio value.

19. A method as set forth in claim 18 further comprising fueling the internal combustion engine immediately upon the next drive cycle when the current denominator floor ratio is less than the pre-defined minimum denominator floor ratio value.

20. A method as set forth in claim 19 further comprising maintaining operation of the internal combustion engine for a time sufficient to allow the onboard diagnostic system to complete a diagnostic check to allow the saved numerator to increment.

* * * * *